Patented June 20, 1933

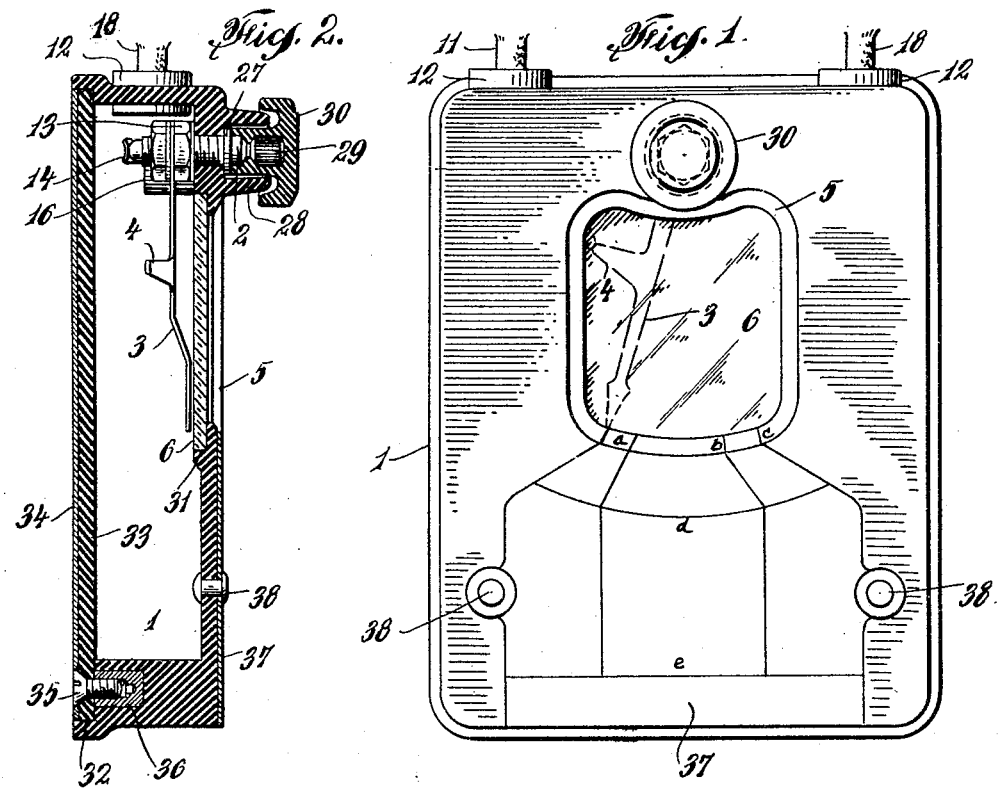
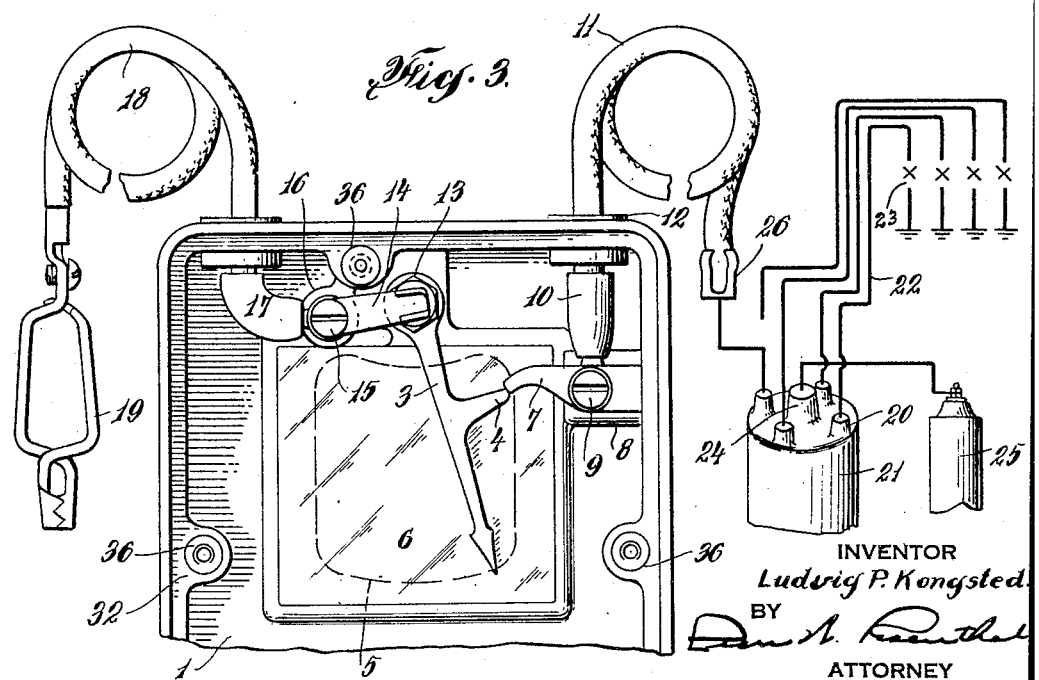

1,914,808

UNITED STATES PATENT OFFICE

LUDVIG P. KONGSTED, OF LONGMEADOW, MASSACHUSETTS, ASSIGNOR TO UNITED AMERICAN BOSCH CORPORATION, OF SPRINGFIELD, MASSACHUSETTS, A CORPORATION OF NEW YORK

TESTING DEVICE

Application filed March 12, 1932. Serial No. 598,382.

My invention relates to improvements in testing devices and particularly to a tester for coils and cables in electrical circuits.

An object of the invention is to provide a coil-and-cable tester adapted to be utilized in connection with high tension coils and cables in the ignition circuits of internal combustion engines; so that the condition and efficiency of the coils and cables can be readily ascertained.

A further object of this invention is to provide a coil-and-cable tester which can very readily be connected for use; which is easy to employ and handle; and which can be manufactured in relatively simple form at comparatively little expense.

On the drawing, which illustrates a preferred form of the invention, the construction of the device is shown by way of example; and I reserve the right to make changes in the shape, size and arrangement of the parts to the full extent consistent with the broad and general meanings of the terms of the appended claims.

On said drawing:

Fig. 1 is a front view of a tester according to this invention;

Fig. 2 is a longitudinal section through the middle of Fig. 1; and,

Fig. 3 shows a rear view of a part of the tester, including the connections to a circuit in which the coils and cables are to be examined.

The same numerals identify the same parts throughout.

The tester comprises a casing 1 of suitable insulating material in the front of which, near one end, is mounted a short shaft 2 carrying inside of the casing a rigid arm or index pointer 3 having a lateral projection 4. This pointer 3 is mounted to be moved across a window opening 5, which is closed by a pane of glass or like transparent material 6. The projection 4 serves as an electrode and is arranged to cooperate with an electrode 7 made fast to a projection 8 inside of the casing by a screw or the like fastening device 9. By means of the screw 9 a metallic socket 10 is also anchored to the projection 8; and this socket receives the inner end of the conductor of a cable 11, which enters the casing 1 through a bushing 12. When the shaft 2 is turned, it moves the pointer 3 so as to separate the arm 4 from the electrode 7 by a spark gap of greater or less length.

The shaft 2 is mounted to turn in an aperture in the front of the casing above the window 5 and it is threaded on its inner end to receive the nuts 14 between which the index pointer or arm 3 is clamped. The inner extremity of this shaft makes contact with a resilient leaf spring 14 which presses against the shaft at one end and is anchored at the opposite end by a screw 15 engaging a threaded aperture in a projection 16 inside the casing 1. This screw also secures a curved socket 17 which, like the socket 10, receives the end of a cable 18 to connect said cable to the element 14 and pointer 3. The cable 18 also passes through a bushing 12 and carries on its outer end a clip 19 to enable connection to be readily made with any suitable part of an internal combustion engine or the framework of a vehicle carrying same to be propelled thereby.

In practice the end of the cable 11 is joined to one of the terminals 20 of a distributor 21 from which extend high tension leads 22 to the spark-plugs or igniters 23 in the cylinders of the engine. A lead 24 connects the central terminal of the distributor to the high tension coil 25. In practice, when the rotating brush of the distributor operates, a connection is established so as to produce a spark at each of the spark gaps 23 by turns. When the coil and the lead uniting it to the mid-point 24 of the distributor are to be tested, one of the spark-plug cables 22 is disconnected and the outer end of the cable 11, which carries a terminal 26, is pushed into the socket of the vacant terminal 20. Thus one of the cylinders of the engine will no longer fire, but the other cylinders will remain in operation and the performance of the coil and cable can be watched. The shaft 22 is now turned to carry the pointer 3 away from the electrode 7 and thus establishes a spark gap between this electrode and the projection 4. The longer the spark passing thereover, the better the coil performs on high-speed high-compression engines.

The shaft 2 has a collar 27 near its outer end abutting against a shoulder at the bottom of a boss 28 on the exterior of the casing 1; and the outer end of the shaft is fluted at 29, so that an operating knob 30 can be molded thereon. The turning of the knob of course moves the arm or pointer 3 as far as required, say to the right of Fig. 1; and in practice this knob is always turned to see what is the greatest length of the gap between the projection 4 and terminal 7 over which a discharge can be obtained from the coil 25.

The window pane 6 is secured in any suitable manner against an inside shoulder 31 surrounding the opening 5; and at the rear the sides of the casing have another inside shoulder 32 to receive a closure 33, likewise of insulation. This closure may be faced on its outside by means of a metallic plate 34 which may bear directions indicating how the tester is to be used. The closure 33 and plate 34 are secured by screws 35 engaging threaded sockets 36 embedded in the sides of the casing 1.

The front of the casing 1 may also receive a plate of suitable material 37 held fast by rivets 38 and this plate will be divided by lines such as $a$, $b$, $c$, $d$ and $e$ into spaces to make the plate serve as a dial, the spaces being filled with reading matter to reveal the significance of the readings, and with instructions as to how the test is to be conducted and what should be done with the coil or the ignition circuit in accordance with the results of the test.

The aperture in the casing for the shaft 2 is of course smooth and this shaft is threaded only for the purpose of receiving the binding nuts 16. These nuts and the collar 27 prevent axial movement of the shaft, and washers between the nuts and the inside of the casing 1 may be added if desired.

The tester thus constitutes a very useful appliance which can be easily handled by a garage man or mechanic when one desires to find out whether or not the coils and cables of the ignition circuit are in good operative condition.

The method of using the tester and the instructions and other reading matter upon the plates 34 and 37 afford considerable advantage because direct information is thereby conveyed with regard to the condition of the coil and the ignition system and direct instructions are given which can easily be understood by anyone, so that the necessary measures can be taken with the least possible trouble to adjust or repair the coils or circuits as may be required. Also by disconnecting one of the leads 22 to the spark-plugs and connecting in the cable 11 instead, current which would otherwise go to the particular plug disconnected passes directly to the ground through the tester and thus the entire output of the coil and each of the cables in succession can be ascertained, while the engine continues to operate with one less than the full number of cylinders each time that the coil and one of the cables is examined with the tester according to this invention. Such a method affords a complete and accurate test of the condition of the coil because it enables the operator to tell just how the coil and the particular cable is working. Without disconnecting one of the plugs a complete check-up of coil and cables can not be obtained, because there is no way of finding out how much spark energy the spark plug itself may absorb. Hence the insufficiency of methods whereby similar tests are attempted with a coil and circuit when a spark plug is allowed to remain in the circuit; because the energy consumed at the spark points is always variable and depends on the gap between the points. By means of my improved tester and mode of operating therewith, the spark-plug is not left in the circuit when the tester is used and the condition of the coil and leads can therefore be much more satisfactorily demonstrated. At the same time the directions on the outside of the tester give the user an exact explanation of what the position of the pointer 3 signifies whenever a test of an ignition coil with high tension cables is undertaken.

Having described my invention, what I claim as new and desire to secure and protect by Letters Patent in the United States is:

1. A tester comprising an insulating casing, a fixed electrode therein, a socket attached to the electrode, a cable connected to said socket and extending to the outside of the casing, a short shaft rotatable in the wall thereof, the casing having an exterior boss surrounding the outer end of said shaft, an operating knob on said end, an arm attached to the inner end of the shaft and having a lateral projection to cooperate with said fixed electrode, a spring secured to the inside of the casing and making contact with the inner extremity of said shaft, a metallic socket attached to said spring and a second cable secured in said socket and extending through to the outside of the casing.

2. A tester comprising an insulating casing, a fixed electrode therein, a cable connected to said electrode and extending to the outside of said casing, a short shaft rotatable in the wall thereof, an operating knob on the outer end of said shaft, an arm attached to the inner end of the shaft to cooperate with said fixed electrode, a spring secured to the inside of the casing and making contact with the inner end of the shaft, and a second cable attached to said spring and extending through to the outside of the casing.

3. A tester comprising an insulating casing, a fixed electrode therein, a socket in the casing attached to the electrode, a cable connected to the socket and extending to the outside of the casing, a short shaft rotatable in the wall thereof, an operating knob on the outer end of the shaft, an arm attached to the inner end of the shaft to cooperate with the fixed electrode, a spring secured to the inside of the casing and making contact with the inner end of the shaft, a metallic socket attached to the spring in the casing, and a second cable secured to said socket and extending through to the outside of the casing.

4. A tester comprising an insulating casing, a fixed electrode therein, a cable connected to said electrode and extending to the outside of the casing, a short shaft rotatable in the wall thereof, the casing having an exterior boss of insulation surrounding the outer end of the shaft, an operating knob on said end, an arm attached to the inner end of the shaft to cooperate with said fixed electrode, a spring secured to the inside of the casing and making contact with the inner extremity of the shaft, and a second cable secured to the spring and extending through to the outside of the casing.

In testimony whereof I affix my signature.

LUDVIG P. KONGSTED.